United States Patent
Chen et al.

(10) Patent No.: US 11,404,961 B2
(45) Date of Patent: Aug. 2, 2022

(54) ON-TIME COMPENSATION IN A POWER CONVERTER

(71) Applicant: Infineon Technologies Austria AG, Villach (AT)

(72) Inventors: Keng Chen, Acton, MA (US); James R. Garrett, Windham, NH (US)

(73) Assignee: Infineon Technologies Austria AG, Villach (AT)

( * ) Notice: Subject to any disclaimer, the term of this patent is extended or adjusted under 35 U.S.C. 154(b) by 86 days.

(21) Appl. No.: 16/884,794

(22) Filed: May 27, 2020

(65) Prior Publication Data
US 2021/0376724 A1 Dec. 2, 2021

(51) Int. Cl.
*H02M 3/155* (2006.01)
*H02M 1/00* (2006.01)

(52) U.S. Cl.
CPC .......... *H02M 3/155* (2013.01); *H02M 1/0025* (2021.05)

(58) Field of Classification Search
CPC ................. H02M 3/155–1588; H02M 1/0025
See application file for complete search history.

(56) References Cited

U.S. PATENT DOCUMENTS

| | | | | |
|---|---|---|---|---|
| 2013/0093405 | A1* | 4/2013 | De Cremoux | H02M 3/156 323/282 |
| 2015/0280557 | A1* | 10/2015 | Xue | H02M 3/156 323/271 |
| 2018/0012879 | A1* | 1/2018 | Mantiply | H05K 3/3436 |
| 2022/0077778 | A1* | 3/2022 | Zafarana | H02M 1/08 |

FOREIGN PATENT DOCUMENTS

CN 110224592 A 9/2019

OTHER PUBLICATIONS

EP Extended Search Report, EP 21774672.2, dated Oct. 5, 2021, pp. 1-7.
Liu Pei-Hsin, et al., "Hybrid interleaving with adaptive PLL loop for adaptive on-time controlled switching converters", 2014 IEEE Energy Conversion Congress and Exposition (ECCE), IEEE, Sep. 14, 2014 (Sep. 14, 2014), pp. 4110-4117, XP032680913, DOI: 10.1109/eCCE.2014.6953961.

* cited by examiner

*Primary Examiner* — Peter M Novak
(74) *Attorney, Agent, or Firm* — Armis IP Law, LLC

(57) ABSTRACT

A power converter includes a switch, an ON-time controller, and a compensator. Over multiple control cycles, the ON-time controller controls an ON-time duration of a control signal driving the switch. Activation of the switch generates an output voltage that powers a dynamic load. The ON-time controller controls attributes such as a switching frequency and/or an ON-time duration of the control signal driving the switch to regulate the output voltage. A phase-locked loop in the compensator supplies the ON-time controller with adjustment signals that adjust the ON-time duration of activating the switch to maintain the switching frequency at a desired setpoint. Thus, if a transient load condition causes the ON-time controller to temporarily operate the switch to at a value other than the desired setpoint frequency, the phase-locked loop of the compensator causes the switching frequency to align with the desired switching frequency again over one or more control cycles.

32 Claims, 10 Drawing Sheets

ON-TIME COMPENSATION IN A POWER CONVERTER

BACKGROUND

Conventional buck converters convert an input voltage into an output voltage. Certain instances of such power converter circuits include control circuitry that controls an ON-time of a switch in a buck converter.

As an example, a conventional constant ON-time generator circuit is an open loop system in which the ON-time pulse duration of a corresponding switch in the power converter circuit is a function of a respective input voltage and output voltage. In one conventional ON-time voltage converter, when a PWM pulse trigger occurs, a Ton_done signal determines the duration of the respective "ON" pulse produced by the controller.

In the traditional method, the Ton_done is generated as a function of both input and output voltage. Any number of switches in the constant ON-time signal generator control an amount of current to charge a respective capacitor. As the voltage on the capacitor increases to above a threshold value, the Ton_done signal is asserted to a high state, resetting the ON-time pulse for the next PWM cycle.

BRIEF DESCRIPTION

A frequency of operating a power converter can be optimized for efficiency. In certain instances, it is desirable to select the frequency of the converter to provide an appropriate transient response. But, more importantly, one problem that customers operating power converters normally have with variable frequency converters is that the application might be sensitive to certain frequencies that could affect an IC (Integrated Circuit) that is being powered or even EMI (Electromagnetic Interference). Embodiments herein make a variable frequency COT (Constant On-Time) power converter seem more like a fixed frequency converter which can be desirable in certain applications (RF power, etc.).

Embodiments herein include novel ways of improving power converter operation.

More specifically, embodiments herein include an apparatus (such as a DC-DC power converter or other suitable entity) comprising: a switch, an ON-time controller, and a compensator. Over multiple control cycles, the ON-time controller controls an ON-time duration of a control signal driving the switch. Activation of the switch generates an output voltage that powers a dynamic load. In one embodiment, the ON-time controller controls a switching frequency and an ON-time duration of the control signal driving the switch to regulate the output voltage. The compensator is in communication with the ON-time controller. The compensator supplies the ON-time controller with one or more adjustment or compensation signals that adjust the ON-time duration of activating the switch to maintain or bias the switching frequency of a respective voltage converter to a desired operating setpoint frequency. During transient load conditions, however, the voltage converter may temporarily operate at a frequency other than the desired operating frequency to accommodate the transient condition.

In one embodiment, the compensator generates compensation adjustment signals whose magnitude varies depending on a difference between the switching frequency of the control signal and a setpoint switching frequency (desired operating frequency) assigned to operating the switch.

In accordance with further example embodiments, the compensator includes a phase-locked loop circuit operative to maintain a magnitude of the switching frequency of the switching control signal at a desired frequency setpoint via adjustments to the ON-time duration. For example, in one embodiment, changes in output current to the load (such as caused by transient current consumption conditions by the load) results in a temporary change in the switching frequency of the control signal as previously discussed. Via a comparator in the compensator, the compensator adjusts the ON-time duration of the control signal for a subsequent control cycle of operating the switch based on a difference between the actual switching frequency of the control signal and a desired setpoint switching frequency assigned to operating the switch for one or more previous control cycles. The adjustments to the ON-time duration changes a magnitude of the switching frequency of the control signal to (substantially) match or be biased towards the setpoint switching frequency for one or more future control cycles.

In yet further example embodiments, the compensator produces an adjustment signal (such as one or more signals) and inputs it to the ON-time controller. In one example instance, the adjustment signal increases the ON-time duration, which decreases a switching frequency of activating the switch while operating in a constant ON-time control mode of controlling the switch over multiple control cycles. In another example instance, the adjustment signal decreases the ON-time duration, which increases a switching frequency of activating the switch while operating in a constant ON-time control mode of controlling the switch over multiple control cycles.

In accordance with still further example embodiments, the power supply as described herein includes a power converter in which the switch resides. The power converter converts an input voltage into the output voltage that powers the load. The adjusted ON-time duration provides compensation of a frequency shift of the switching frequency otherwise caused by resistive losses of the power converter circuit.

Note further that the ON-time controller as described herein can be configured to include any suitable one or more resources. For example, in one embodiment, the ON-time controller includes: a capacitor, a current source, and a comparator. The current source supplies current to the capacitor, producing a ramp voltage on the capacitor. In one embodiment, the comparator compares the ramp voltage to a threshold value (such as an error voltage). An output of the comparator controls operation of the switch control signal. The compensator produces a drive current that adjusts a slope of the ramp voltage depending on a comparison of the switching frequency of the control signal to an assigned setpoint switching frequency.

In accordance with further embodiments, the compensator produces a source current and/or a sink current applied to the capacitor; magnitudes of the source and/or sink signal vary depending on a difference between the switching frequency of the control signal and a setpoint switching frequency for one or more previous control cycles.

In yet further example embodiments, the ON-time controller produces the ON-time duration as a function of an input voltage and the output voltage; the ON-time controller controls the switch of the power converter via the control signal to convert the input voltage into the output voltage.

Embodiments herein are useful over conventional techniques. For example, an ON-time controller supplies an output voltage to a load at a desired switching frequency. During transient conditions, the ON-time controller modifies the switching frequency and/or ON-time duration of the switch circuitry in the power converter to maintain the output voltage within regulation during transient conditions. Subsequent to the transient condition, when the current consumption by the load reverts back to steady state, a phase-locked loop circuit in the power converter gradually adjusts the ON-time duration of the switch over one or more cycles to maintain or bias the switching frequency of the switch at a desired setpoint frequency. Thus, during transient conditions, the switching frequency of operating the switch varies to maintain regulation of the output voltage. During steady states conditions, the power converter operates near its desired operating frequency, resulting in higher voltage conversion efficiency.

These and other more specific embodiments are disclosed in more detail below.

Note that techniques as discussed herein can be implemented in any suitable environment such as amplifier circuitry, power supplies, multi-phase power supply applications, single phase point of load (a.k.a., POL) power supply applications, etc.

Note further that although embodiments as discussed herein are applicable to multi-phase power supply circuits such as those implementing buck converters, DC-DC converter phases, the concepts disclosed herein may be advantageously applied to any other suitable topologies as well as general power supply control applications.

Additionally, note that embodiments herein can include computer processor hardware (that executes corresponding switch instructions) to carry out and/or support any or all of the method operations disclosed herein. In other words, one or more computerized devices or processors (computer processor hardware) can be programmed and/or configured to operate as explained herein to carry out different embodiments of the invention.

Yet other embodiments herein include software programs to perform the steps and operations summarized above and disclosed in detail below. One such embodiment comprises a computer program product that has non-transitory computer-storage media (e.g., memory, disk, flash, . . . ) including computer program instructions and/or logic encoded thereon that, when performed in a computerized device having a processor and corresponding memory, programs the processor to perform any of the operations disclosed herein. Such arrangements are typically provided as software instructions, code, and/or other data (e.g., data structures) arranged or encoded on a computer readable storage medium or non-transitory computer readable media such as an optical medium (e.g., CD-ROM), floppy or hard disk or other a medium such as firmware or microcode in one or more ROM or RAM or PROM chips, an Application Specific Integrated Circuit (ASIC), circuit logic, etc. The software or firmware or other such configurations can be installed onto a respective controller circuit to cause the controller circuit (such as logic) to perform the techniques explained herein.

Accordingly, one embodiment of the present disclosure is directed to a computer program product that includes a computer readable medium having instructions stored thereon for supporting operations such as controlling one or more phases in a power supply. For example, in one embodiment, the instructions, when carried out by computer processor hardware (one or more computer devices, control logic, digital circuitry, etc.), cause the computer processor hardware to: via activation of a switch over multiple control cycles, generate an output voltage to power a dynamic load; control an on-time duration of a control signal driving the switch to regulate the output voltage; and adjust the on-time duration of the control signal depending on a switching frequency of the control signal.

The ordering of the operations has been added for clarity sake. The operations can be performed in any suitable order.

It is to be understood that the system, method, device, apparatus, logic, etc., as discussed herein can be embodied strictly as hardware (such as analog circuitry, digital circuitry, logic, etc.), as a hybrid of software and hardware, or as software alone such as within a processor, or within an operating system or a within a software application.

Note that although each of the different features, techniques, configurations, etc., herein may be discussed in different places of this disclosure, it is intended, where appropriate, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
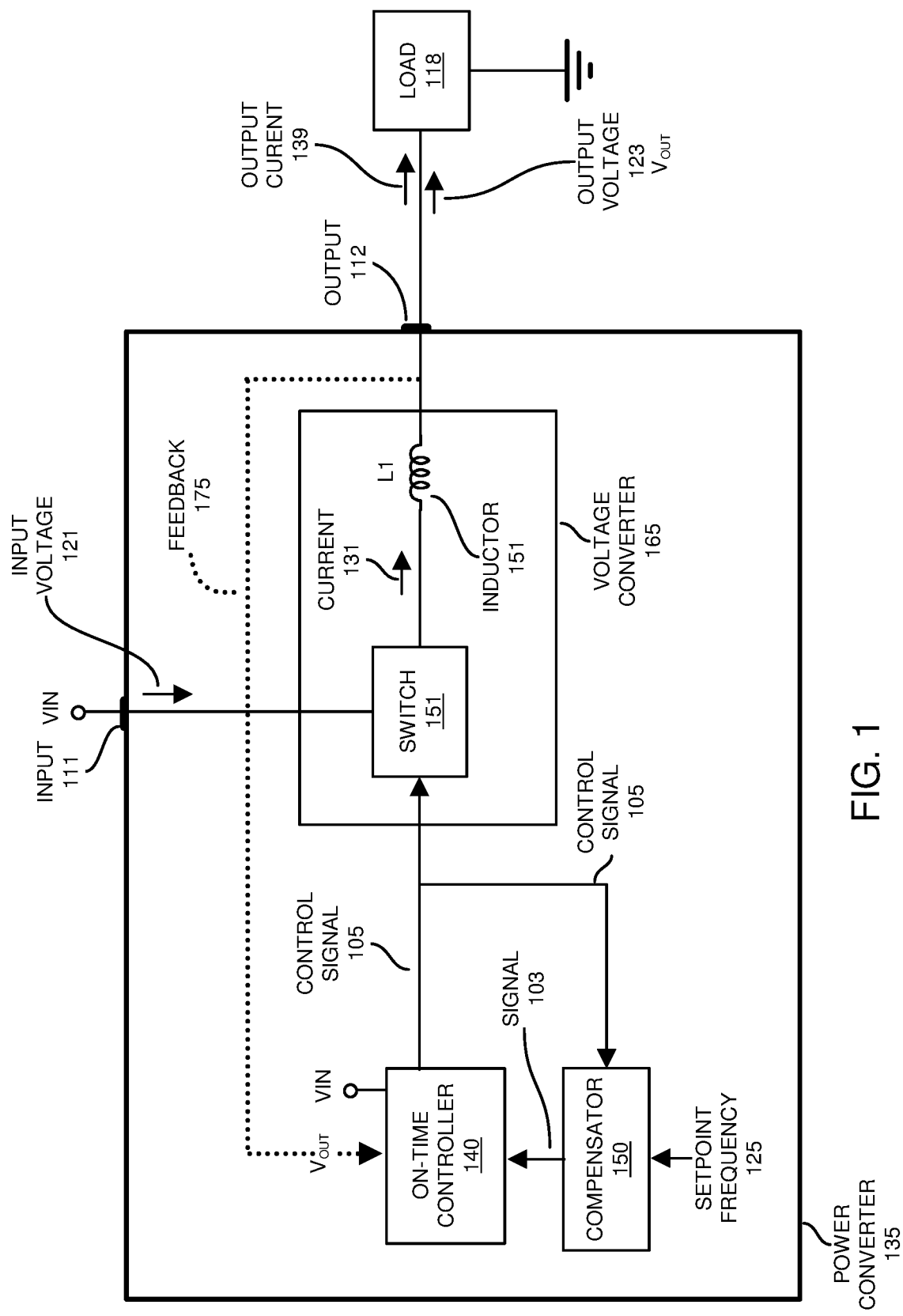
FIG. 1 is an example diagram illustrating a power converter including a compensator according to embodiments herein.

The foregoing and other objects, features, and advantages of embodiments will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example embodiments, an apparatus such as a DC-DC power converter includes a switch, an ON-time controller, and a compensator. Over multiple control cycles, the ON-time controller controls an ON-time duration of a control signal driving the switch.

Activation of the switch generates an output voltage that powers a dynamic load. The ON-time controller controls attributes such as a switching frequency and/or an ON-time duration of the control signal driving the switch to regulate the output voltage. A phase-locked loop in the compensator supplies the ON-time controller with adjustment signals that adjust the ON-time duration of activating the switch to maintain the switching frequency at a desired setpoint. Thus, if a transient load condition causes the ON-time controller to temporarily operate the switch at a frequency other than the desired setpoint frequency, the phase-locked loop of the compensator causes the switching frequency to align with the desired switching frequency again over one or more control cycles after the load and power converter reach a steady state again.

Now, more specifically, FIG. 1 is an example diagram illustrating a power converter including a compensator according to embodiments herein.

As shown, the power converter 100 includes an interconnection of compensator 150, ON-time controller 140, switch 151 (switch circuitry such as one or more switches), and inductor 144.

The power converter 100 (a.k.a., apparatus) includes input 111 (first port) to receive input voltage 121 from voltage source, Vin. The power converter 100 includes output 112 (second port) to output respective output voltage 123 (Vout) and corresponding output current 131 that powers dynamic load 118.

In one embodiment, the feedback 175 feeds back the output voltage 123 from the output of inductor 144 (L1) to the ON-time controller 140. ON-time controller 140 also receives input voltage (Vin).

In general, the ON-time controller 140 controls states of the switch 151 to convert the input voltage 121 in the output voltage 123. More specifically, during operation, repeated switching of switch 151 in the power converter 100 between ON and OFF over multiple control cycles causes current to flow from the voltage source 121 through the switch 151 and corresponding inductor 144 to the dynamic load 118. In one embodiment, the combination of switch 151 and the inductor 144 represent a voltage converter 165. Thus, repeated cycles of activating and deactivating the switch 151 in the voltage converter 165 generates the output voltage 123 and corresponding current 131 that powers the dynamic load 118.

Embodiments herein include providing compensation input such as signal 103 to the ON-time controller 140 to adjust an ON-time duration of activating the switch 151 for a given control cycle. For example, via activation of the switch 151 over multiple control cycles, the power converter 100 generates an output voltage 123 to power the dynamic load 118. The ON-time controller 140 controls an on-time duration of the control signal 105 driving the switch 151 to regulate the output voltage 123 as the load changes. As discussed herein, via the compensation signal 103, the compensator 150 adjusts the ON-time duration associated with activating the switch 151 depending on a comparison of the current switching frequency of the control signal 105 to the desired setpoint frequency 125. More specifically, in one embodiment, the compensator 150 generates one or more compensation adjustment signals 103 whose magnitude varies depending on a difference between the switching frequency of the control signal 105 and a setpoint switching frequency 125 (desired operating frequency) assigned to operate the switch 151.

In general, if the current switching frequency of the control signal 105 is greater than the desired setpoint frequency 125, the compensator 150 produces the compensation signal 103 to gradually reduce the switching frequency of the control signal 105 via increasing a duration of the ON-time duration of the switch 151; conversely, if the current switching frequency of the control signal 105 is less than the desired setpoint frequency 125, the compensator 150 (such as via implementation of a phase-locked loop) produces the compensation signal 103 to gradually increase the switching frequency of the control signal 105 via decreasing an ON-time duration of the switch 151.

In one embodiment, the adjustment to the ON-time duration as controlled by the compensator 150 and the ON-time controller 140 improves an efficiency of generating the output voltage 123. For example, in one embodiment, the adjustments to the ON-time duration of the switch 151 causes the switch to operate at or very near the desired setpoint frequency 125, reducing occurrence of a corresponding frequency shift from the desired operating setpoint 125 of the power converter 100.

As a more specific example, during heavy load conditions when the dynamic load 118 consumes a large amount of current 131 such as above a threshold value, the power converter 100 experiences substantial internal voltage drops due to the high amount of current passing through resistive components of the power converter 100. Source of internal voltage loss can be due to the resistance of the switch 151, DC resistance of the inductor device 144, resistance of circuit paths, etc.). As further discussed below, during such high output current 131 conditions, to accommodate for the internal error voltage losses, the compensator 150 in conjunction with the ON-time controller 140 increases the ON-time duration of activating the switch 151 to operate the power converter 100 nearer the desired setpoint frequency 125, resulting in more efficient conversion (such as lower losses) of converting an input voltage 121 (from source Vin) into a respective output voltage 123. In other words, the adjustment causes the switching of the switch 151 to be closer to, and often equal to, the desired switching frequency setpoint 125.

However, as previously discussed, the ON-time controller 140 may temporarily control the switch 151 at different switching frequencies to accommodate transient conditions in which current delivered to the load 118 suddenly changes.

Figure 2:
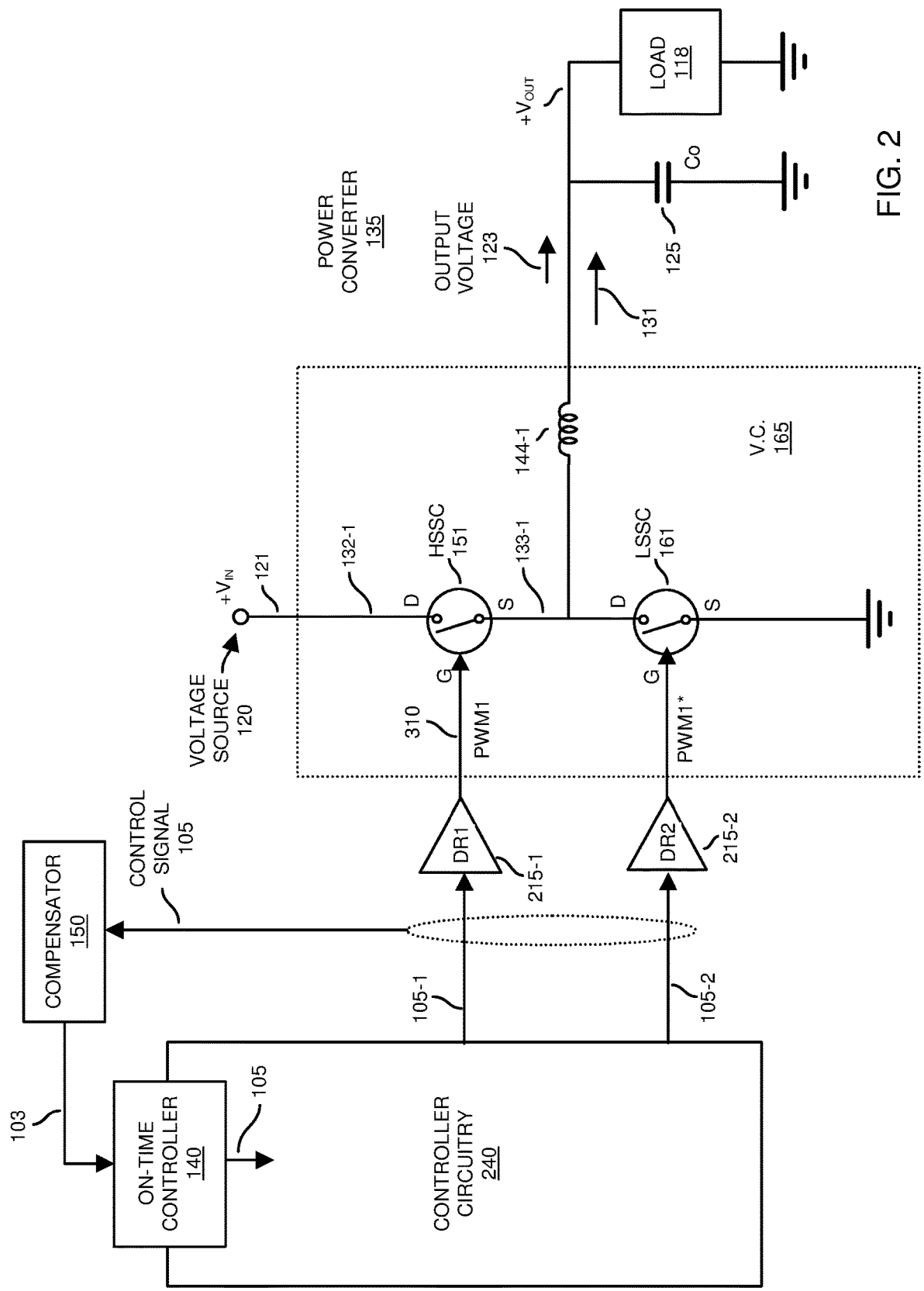
FIG. 2 is an example diagram illustrating a power converter controlled by an ON-time controller according to embodiments herein.

FIG. 2 is an example diagram illustrating a power converter phase controlled by an ON-time controller according to embodiments herein.

In this example embodiment, the power converter 100 (such as a phase in a power supply) includes compensator 150, ON-time controller 140, controller circuitry 240, driver 215-1, driver 215-2, switch 151 (a.k.a., high side switch circuitry), switch 161 (such as low side switch circuitry), inductor 144, and output capacitor 125.

As shown, the compensator 150 is coupled to receive control signal 105; ON-time controller 140 is coupled to receive signal 103 from the compensator 150. The ON-time controller 140 associated with the controller circuitry 240 produces control signal 105-1 inputted to the corresponding driver 215-1.

Driver 215-1 and corresponding control signal 105-1 controls operation of switch 151; driver 215-2 and corresponding control signal 105-2 controls operation of switch 161.

Yet further, note that the combination of switch 151 and switch 161 are coupled in series between the input voltage 121 and a ground reference voltage.

For example, the drain node (D) such as node 132-1 of the switch 151 is coupled to the input voltage source, Vin. The source node (S) of switch 161 is coupled to a ground reference. The source node (S) of the switch 151 is connected to the drain node (D) of the switch 161 at corresponding node 133-1.

Inductor 144 is coupled between the node 133-1 and the output 112 of the power converter 135.

The output capacitor 125 is coupled between the output of inductor 144 and ground. As previously discussed, the output of the inductor 144 is connected to the load 118.

In one embodiment, the power converter 135 operates in a constant on-time control mode in which the controller circuitry 240 and corresponding ON-time controller 140 generate respective ON-time pulses for a respective ON-time duration over each of multiple control cycles to maintain the magnitude of the output voltage 123 in regulation such as within a desired voltage range.

Figure 3:
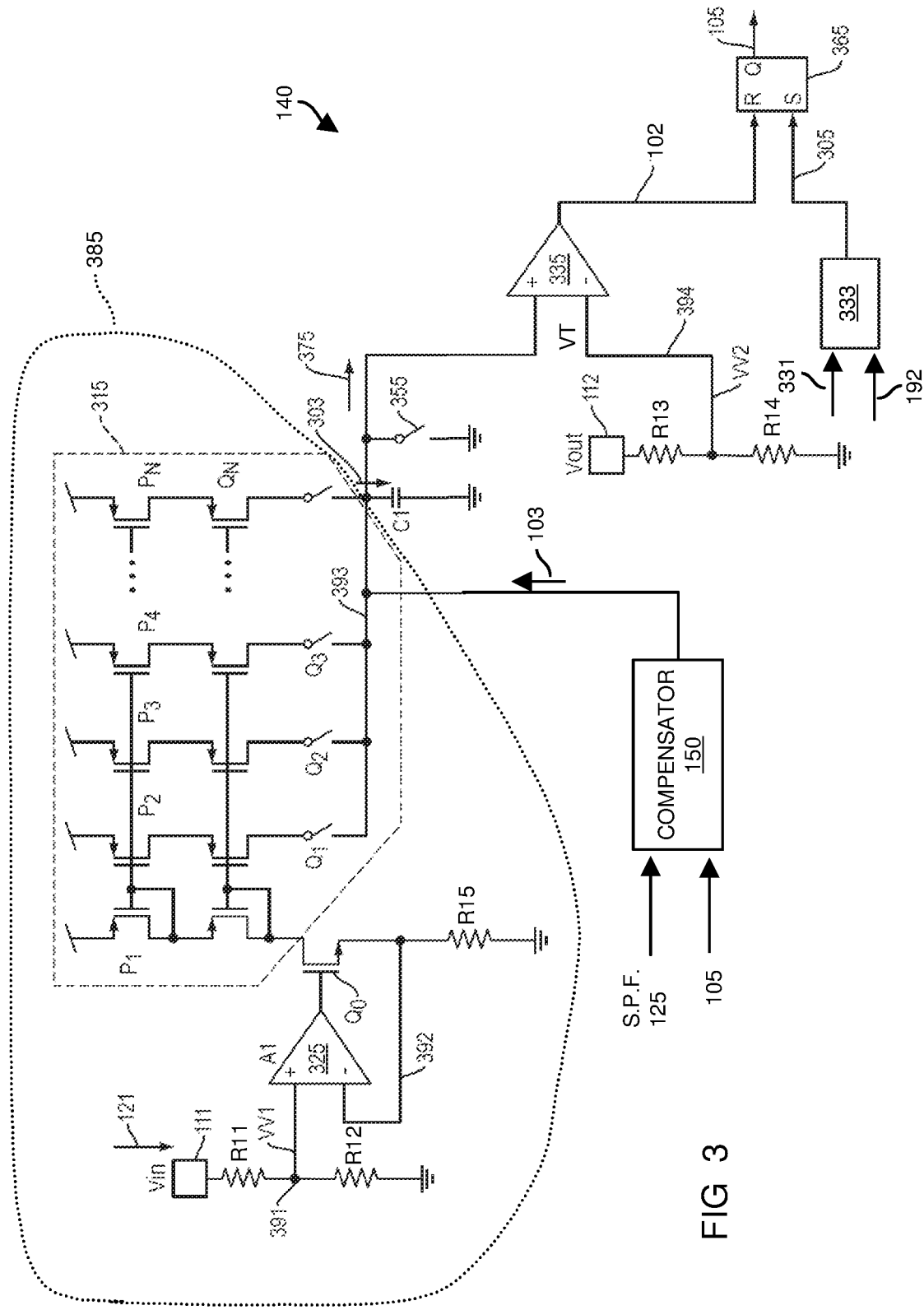
FIG. 3 is an example diagram illustrating components in an ON-time controller according to embodiments herein.

FIG. 3 is an example diagram illustrating an ON-time controller according to embodiments herein.

As shown, the ON-time controller 140 can be configured to include multiple resistors R11, R12, R13, R14, and R15), amplifier 325, switch Q0, current digital-to-analog converter 315 including multiple switches (Q1, Q2, Q3, . . . , Qn, P1, P2, P3, . . . , Pn), capacitor C1, voltage reset switch 355, comparator 335, and buffer 365 (such as an S-R flip-flop).

In general, current source 385 produces current 303 to produce ramp voltage 375. Current source 385 includes resistor R11, resistor R12, amplifier 325, switch Q0, resistor R15, and current digital-to-analog converter 315. As its name suggests, the current source 385 produces current 303 supplied to capacitor C1 to produce a ramp voltage 375.

In this example embodiment, compensator 150 produces adjustment signal 103 as described herein, such as providing source or sink current that adjusts a rate of the ramp voltage 375.

As further shown, resistor R11 and R12 are connected in series. Node 391 is set to a voltage value VV1 equal to [R12/(R11+R12)]×Vin.

The voltage value VV1 at node 391 is inputted to the non-inverting input node (+) of the amplifier 325. The non-inverting input (−) of amplifier is coupled to node 392. Resistor R5 is connected between the output of switch Q0 (node 392) and ground. Thus, the inverting input of the amplifier 325 is coupled to the node 392 between the switch Q0 and resistor R15. A combination of amplifier 325 output supplied to switch Q0 controls operation of the current source 315 (such as a digital-to-analog converter or other suitable one or more components).

During operation, as previously discussed, the current source 315 produces an output current 303 that produces a ramp voltage 375 at node 393 of the capacitor C1. For example, a combination of amplifier 325, resistor R15, switch Q0 and current digital-to-analog converter 315 is a voltage-to-current converter. The magnitude of the current 303 outputted from the current digital-to-analog converter 315 varies in relation to the input voltage 121 and corresponding voltage VV1 at node 391. In one embodiment, the current 303 is substantially constant but may vary depending on voltage VV1 if it changes over time.

Based on a comparison of the control signal 105 to the setpoint frequency 125, the compensator 150 produces the adjustment signal 103.

For example as further discussed herein, if the switching frequency of the control signal 105 is greater than the setpoint frequency 125, the adjustment signal 103 sinks current from capacitor C1 to the ground reference, increasing the ON-time duration, which decreases a switching frequency of the control signal 105 while operating in a constant ON-time control mode of controlling the switch over multiple control cycles.

If the switching frequency of the control signal 105 is less than the setpoint frequency 125, the adjustment signal 103 sources current to the capacitor C1, decreasing the ON-time duration, which increases a switching frequency of the control signal 105 while operating in a constant ON-time control mode of controlling the switch 151 over multiple control cycles.

If the switching frequency of the control signal 105 is equal to the setpoint frequency 125, the adjustment signal 103 (current) is set to zero amps, resulting in no effect to the switching frequency of control signal 105.

Thus, via adjustment signal 103, the compensator 150 also controls (modifies, if needed) a ramp rate of generating the ramp voltage 375.

In accordance with further example embodiments, ON-time controller 140 produces the control signal 105 based on a comparison of the ramp voltage 375 stored in capacitor C1 and threshold value VT. For example, the inverting input node (−) of comparator 335 receives voltage VT from voltage divider R13 and R14, where the voltage VT equals [R14/(R13+R14)]×Vout (123).

The non-inverting input node (+) of comparator 335 receives the ramp voltage 375. Comparator 335 compares the magnitude of the ramp voltage 375 inputted to the voltage VT (threshold value) inputted to the inverting input node of the comparator 335. Corresponding signal 102 controls operation of resetting the flip-flop 365.

At a start of a generating the ON-time duration (signal 105), the controller 140 produces signal 305 via output of amplifier 333 to set the output signal 105 of the buffer 365 to a logic high state. In one embodiment, the comparator 333 compares the error voltage 192 to the offset reference voltage 331 to produce the signal 305. When the signal 305 goes high because the error voltage 192 (such as difference between the output voltage 123 and a setpoint value) crosses the offset reference voltage 331, the (ramp voltage) reset switch 355 is controlled to set to an open state, causing the signal 105 to turn ON. For example, the high side switch circuitry 151 (FIG. 2) is ON (activated) to provide a low impedance path between the input voltage 121 and the inductor 144 (FIG. 2). The ramp voltage 375 on capacitor C1 starts to increase based on a combination of current 303 from the current source 315 plus an amount of sink or source current provided by compensation signal 103.

When a magnitude of the ramp voltage 375 of capacitor C1 equals or exceeds a magnitude of the threshold value VT, the comparator 335 controls the state of signal 102 (inputted R-input) to reset the buffer 365 to a logic zero, ending the respective ON-time duration of controlling the high side switch circuitry 151 to the ON state.

Figure 4:
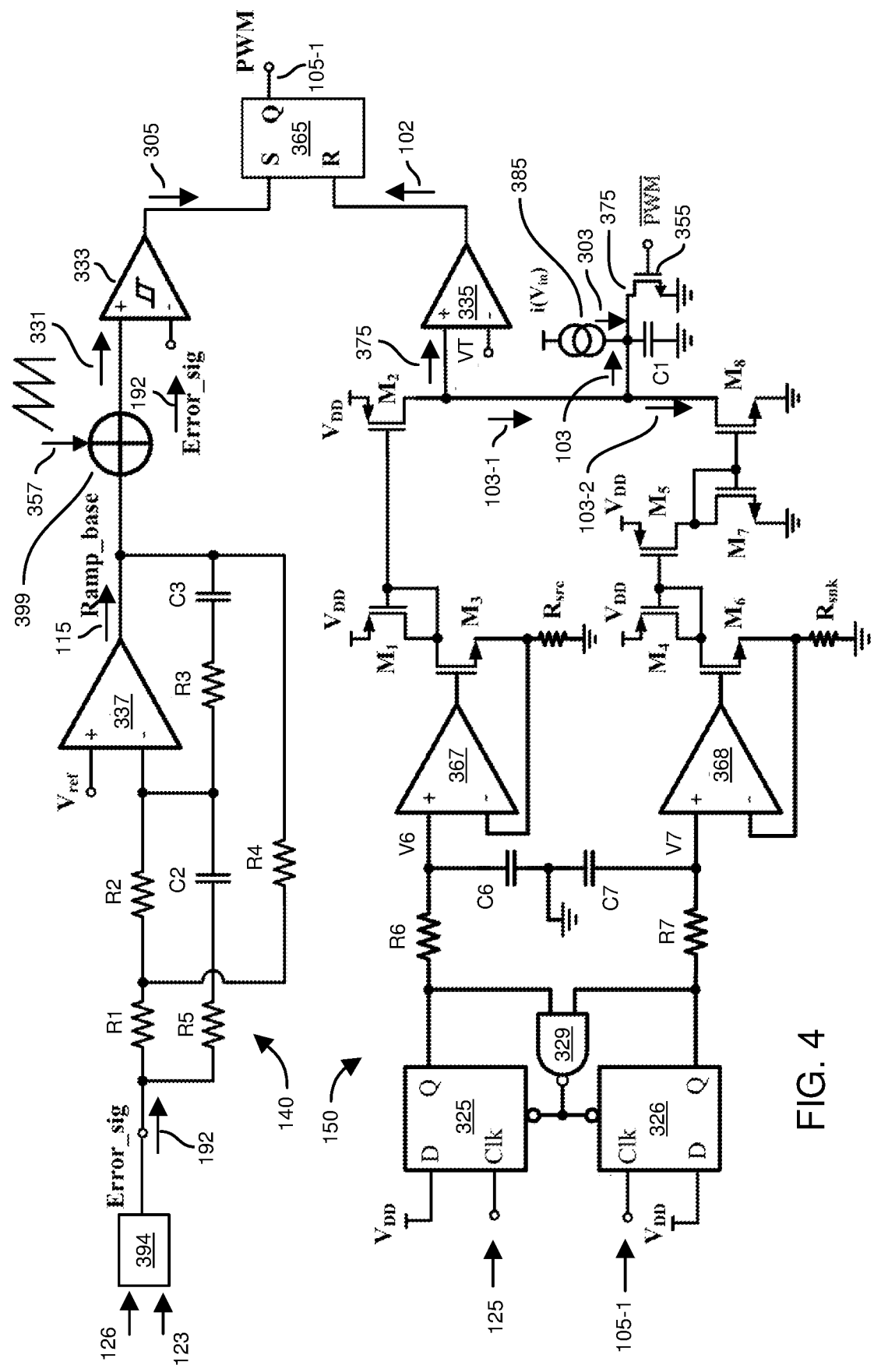
FIG. 4 is an example diagram illustrating an ON-time controller and related components according to embodiments herein

A further illustrative example of the implementing compensation via compensator 150 is shown in FIG. 4.

FIG. 4 is an example timing diagram illustrating modification of a constant ON-time duration based on current consumption according to embodiments herein.

In one embodiment, the compensator 150 is implemented as a phase-locked loop circuit, biasing operation of the switching frequency of the control signal 105 (control signal 105-1 and control signal 105-2) nearer to the desired setpoint frequency 125 in which operation of the power converter 135 is most efficient.

As shown, in this example embodiment, controller 140 includes comparator 394, resistor R1, resistor R2, resistor R3, resistor R4, resistor R5, capacitor C2, capacitor C3, amplifier 337, summer 399, comparator 333, and flip-flop 365. Controller 140 further includes amplifier 335, current source 385, capacitor C1, and reset switch 355.

Further in this non-limiting example embodiment, compensator 150 includes flip-flop 325, flip-flop 326, NAND gate 329, resistor R6, resistor R7, capacitor C6, capacitor C7, amplifier 367, amplifier 368, first transistors M1, M2, M3, second transistors M4, M5, M6, M7, M8, resistor Rsource, and resistor Rsink.

In this example embodiment, the resistors R1 and R2 are connected in series between the comparator 394 and the inverting input of amplifier 337. Resistor R5 and capacitor C2 are connected in series between the comparator 394 and the inverting input node of the amplifier 337. The series combination of resistor R3 and capacitor C3 are connected between the output of the amplifier 337 and the inverting input node of amplifier 337. The voltage Vref is inputted to the non-inverting input node of amplifier 337. The output of amplifier 337 produces floor reference voltage 115 as a function of the error voltage 192 and the voltage reference signal Vref. The amplifier 337 outputs the floor reference voltage 115 to the summer 399. Summer 399 also receives ramp signal 357. Summer 399 produces output reference voltage 331 based upon a summation of the floor reference voltage 115 and the ramp signal 357.

Comparator 333 receives the output reference voltage 331 at the non-inverting input node. The inverting input node of comparator 333 receives the error voltage 192 produced by the comparator 394. Based on a comparison of the error voltage 192 to the offset reference voltage 331, the comparator 333 produces the control signal 305 supplied to the S input of flip-flop 365.

As further shown, with reference to the compensation 150, the D flip-flop 325 receives setpoint frequency 125. The D flip-flop 325 produces output (from output Q) to resistor R6 and a first input of NAND gate 329. The combination of resistor R6 and capacitor C6 form a first low pass filter. A magnitude of the voltage V6 associated with the first low pass filter inputted to the non-inverting input node of amplifier 367 depends upon an amount of time that the output Q of D flip-flop 325 is in a high state.

As further shown, the D flip-flop 326 receives control signal 105-1. The D flip-flop 326 produces output to resistor R7 and a second input of NAND gate 329. The combination of resistor R7 and capacitor C7 form a second low pass filter. A magnitude of the voltage V7 associated with the second low pass filter inputted to the non-inverting input node of amplifier 368 depends upon an amount of time that the output Q of D flip-flop 326 is in a high state.

As further discussed below, the combination of the flip-flop 325, flip-flop 326, and NAND gate 329 is a detection circuit that detects whether the switching frequency of the control signal 105-1 is greater than, less than, or equal to the setpoint switching frequency 125. The combination of amplifier 367, resistor Rsource, and transistors M1, M2, and M3 produce the compensation signal 103-1. For example, based upon the magnitude of the voltage V6 at the noninverting input node, amplifier 367 drives the transistor M3. The magnitude of the compensation signal 103-1 (amount of compensation source current or source current) for future control cycles is proportional to the magnitude of the voltage V6, which varies in magnitude depending on how much greater in frequency the setpoint frequency 125 is to the frequency of the control signal 105-1 for most recent control cycles.

The combination of amplifier 368, resistor Rsink, and transistors M4, M5, M6, M7, and M8 produce the compensation signal 103-2. For example, based upon the magnitude of the voltage V7 at the noninverting input node, amplifier 368 drives the transistor M6. The magnitude of the compensation signal 103-2 (amount of compensation current or sink current) for future control cycles is proportional to the magnitude of the voltage V7, which varies in magnitude depending on how much greater in frequency the frequency of the control signal 105-1 is to the setpoint frequency 125 for most recent control cycles.

In general, when the frequency of the control signal 105-1 is equal to the setpoint frequency 125, the magnitude of voltage V6 is substantially equal to the magnitude of voltage V7. In such an instance, the magnitude of current associated with the compensation signal 103-1 is equal to the magnitude of current associated with the compensate compensation signal 103-2. This means that the magnitude of the compensation signal 103 is zero amps.

When the frequency of the control signal 105-1 is less than the setpoint frequency 125, the voltage V6 of the first low pass filter (resistor R6 and capacitor C6) is greater than the voltage V7 of the second low pass filter (resistor R7 and capacitor C7). This causes the magnitude of current associated with the compensation signal 103-1 to be greater than the magnitude of current associated with the compensation signal 103-2. The net result is that the compensation signal 103 supplies extra current to the capacitor C1. This increases the rate at which the voltage 375 ramps and passes the threshold value VT.

When the frequency of the control signal 105-1 is greater than the setpoint frequency 125, the voltage V6 of the first low pass filter (resistor R6 and capacitor C6) is less than the voltage V7 of the second low pass filter (resistor R7 and capacitor C7). This causes the magnitude of current associated with the compensation signal 103-2 to be greater than the magnitude of current associated with the compensation signal 103-1. The net result is that the compensation signal 103 sinks current from the capacitor C1. This decreases the rate at which the voltage 375 ramps up and passes the threshold value VT.

Thus, this example embodiment illustrates how the compensation signal 103 (combination of compensation signal 103-1 and compensation signal 103-2) produced by the compensator 150 adjusts the constant ON-time duration of signal 105 generated by the ON-time controller 140 over multiple control cycles (such as cycle #1, cycle #2, etc.).

Figure 5:
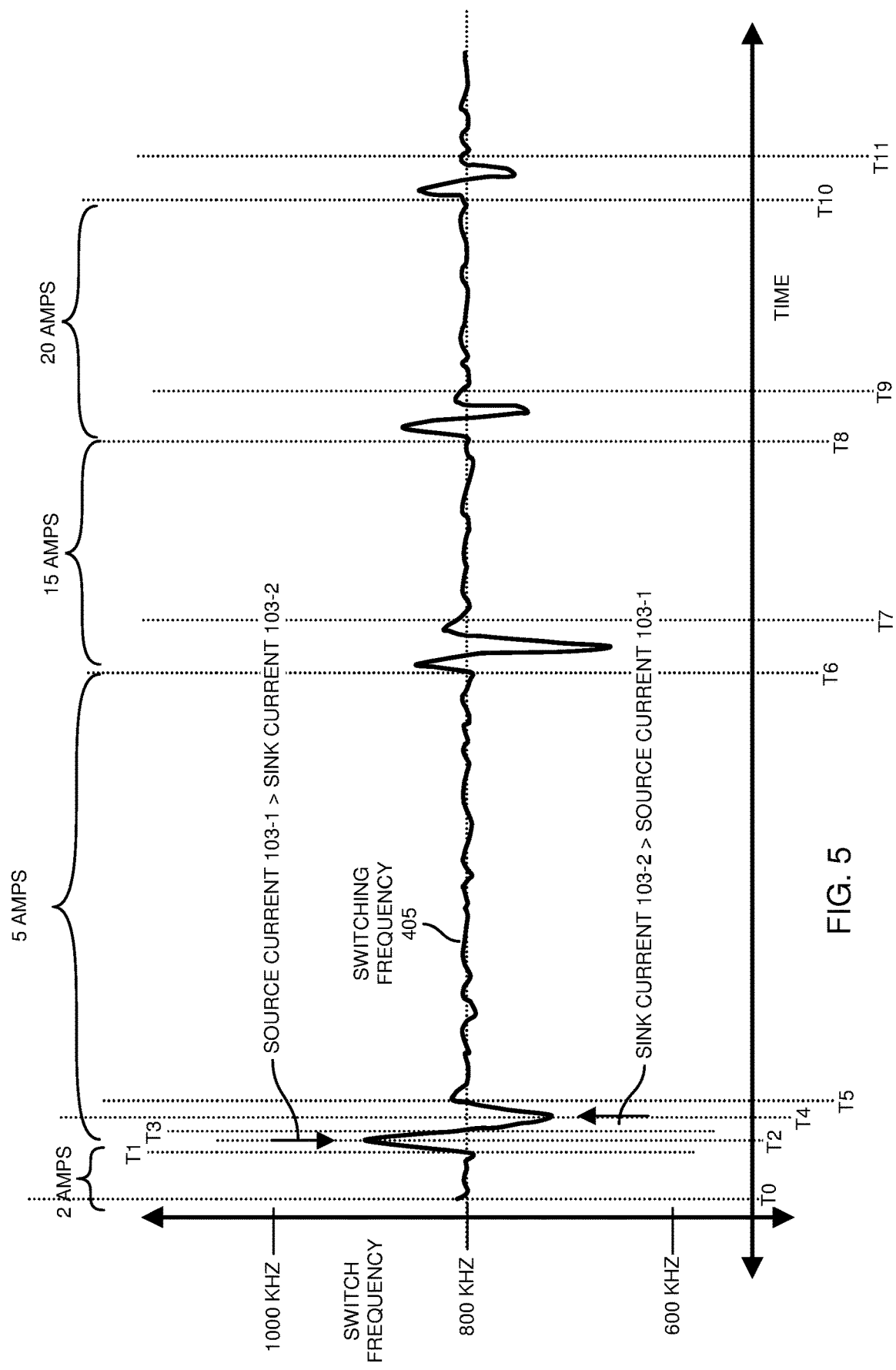
FIG. 5 is an example timing diagram illustrating modification of a frequency of operating the power converter and corresponding switch circuitry based on implementation of a phase-locked loop circuit according to embodiments herein.

FIG. 5 is an example timing diagram illustrating modification of a frequency of operating the power converter and corresponding switch circuitry based on implementation of a phase-locked loop circuit according to embodiments herein.

As shown, such as during steady states, between time T0 and time T1, between time T5 and time T6, between time T7 and time T8, between time T9 and time T10, etc., the controller 140 produces the control signal 105 to have a switching frequency of around the setpoint frequency 125 (such as 800 KHz in this example embodiment).

As further shown, during transient conditions, such as when the load 118 consumes more or less output current 131 provided by the output voltage 123, the controller 140 at least temporarily operates in a different switching frequency than the setpoint frequency 125 to accommodate the change in load conditions. More specifically, in response to the load 118 transitioning from consumption of 2 amps to 5 amps at around time T1, the switching frequency of the control signal 105 is temporarily greater than and/or less than the setpoint frequency 125.

More specifically, between time T1 and time T3, the controller 140 produces the control signal 105 to have a switching frequency greater than the setpoint switching frequency 125 to accommodate the change in current consumption by the load 118 from 2 amperes to 5 amperes at time T1. In such an instance, the peak (maximum) switching frequency occurs at around time T2. Because the switching frequency is greater than the setpoint frequency 125 between time and T1 and time T3, in a manner as previously discussed, the compensator 150 produces the sink current 103-2 to be greater than the source current 103-1. This results in reducing the switching frequency of the control signal 105 towards the setpoint frequency 125.

Between time T3 and time T5, the controller 140 produces the control signal 105 to have a switching frequency less than the setpoint switching frequency 125 to accommodate the change in current consumption by the load 118 from 2 amperes to 5 amperes at time T1. In such an instance, the valley (minimum) switching frequency occurs at around time T4. Because the switching frequency is less than the setpoint frequency 125 between time T3 and time T5, the compensator 150 produces the source current 103-1 to be greater than the sink current 103-2. This results in increasing the switching frequency of the control signal 105 towards the setpoint frequency 125.

Figure 6:
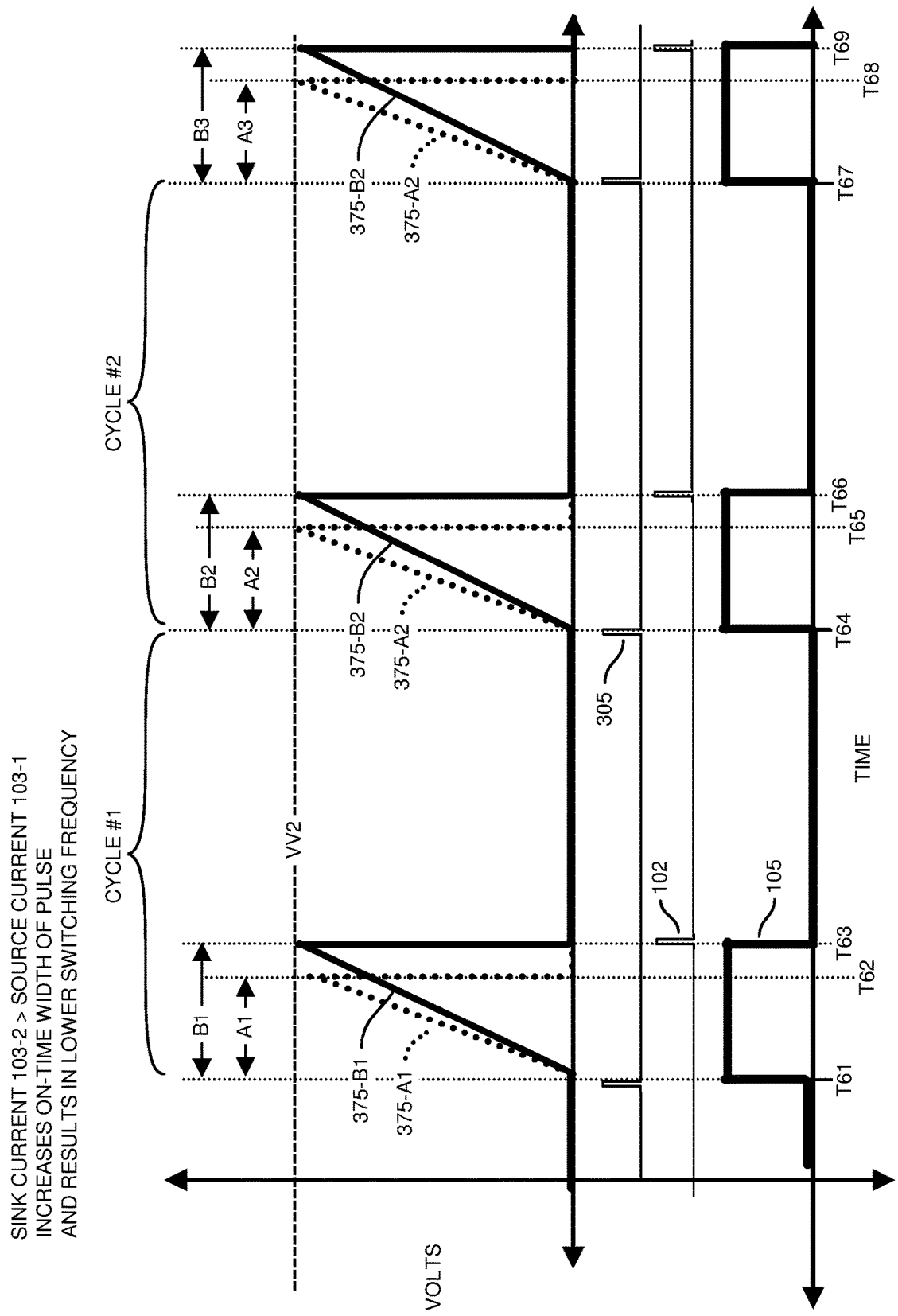
FIG. 6 is an example timing diagram illustrating an increased ON-time duration of activating a switch resulting in a lower switching frequency according to embodiments herein.

FIG. 6 is an example timing diagram illustrating an increased ON-time duration of activating a switch resulting in a lower switching frequency according to embodiments herein.

This example embodiment illustrates how the compensation signal 103 produced by the compensator 150 adjusts the constant ON-time duration of control signal 105 generated by the ON-time controller 140 over multiple control cycles (such as cycle #1, cycle #2, etc.).

For example, duration A1 represents a ramp of the voltage 375 without compensation. During a condition in which the switching frequency 405 of the control signal 105 is greater than the setpoint frequency 125, the compensator 150 produces the adjustment signal 103 to sink current from the capacitor C1 between time T61 and T63, between time T64 and T66, between time T67 and T69, etc. This causes the ON-time of the control signal 105 to be duration B1 instead of duration A1 for control cycle #1; this causes the ON-time of the control signal 105 to be duration B2 instead of duration A2 for control cycle #2; and so on. The increased ON-time reduces a magnitude of the switching frequency 405 of the control signal 105.

In a similar manner, the compensator 150 controls the duration of the ramp voltage 375 over each of multiple control cycles.

Figure 7:
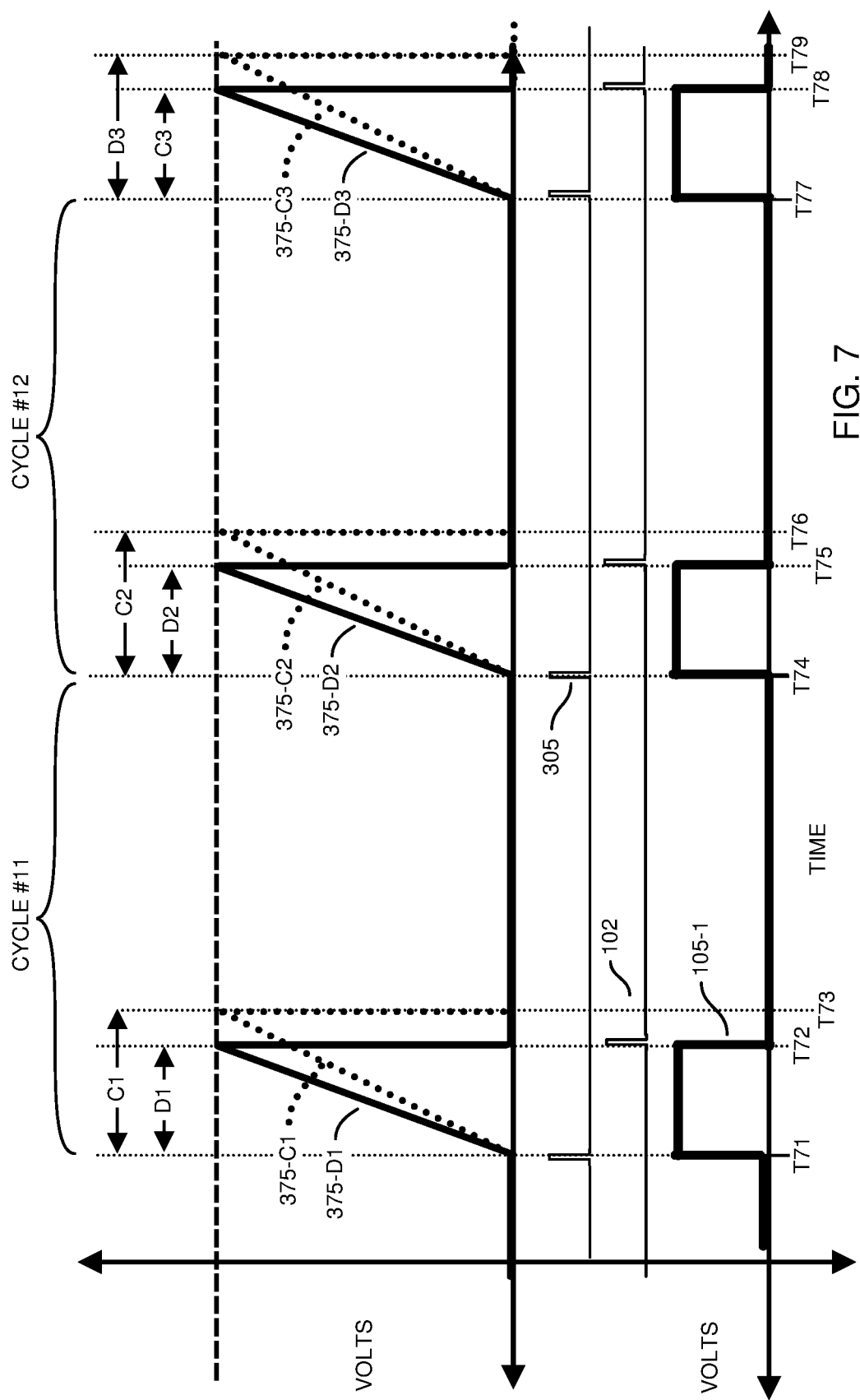
FIG. 7 is an example timing diagram illustrating a decreased ON-time duration of activating a switch resulting in a higher switching frequency according to embodiments herein.

FIG. 7 is an example timing diagram illustrating a decreased ON-time duration of activating a switch resulting in a higher switching frequency according to embodiments herein.

This example embodiment illustrates how the compensation signal 103 produced by the compensator 150 adjusts the constant ON-time duration of control signal 105 generated by the ON-time controller 140 over multiple control cycles (such as cycle #11, cycle #12, etc.).

For example, duration C1 represents a ramp of the voltage 375 without compensation. During a condition in which the switching frequency 405 of the control signal 105 is less than the setpoint frequency 125, the compensator 150 produces the adjustment signal 103 to source current to the capacitor C1 between time T71 and T72, between time T74 and T75, between time T77 and T78, etc. This causes the ON-time of the control signal 105 to be duration D1 instead of duration C1 for control cycle #11; this causes the ON-time of the control signal 105 to be duration D2 instead of duration C2 for control cycle #12; and so on. The decreased ON-time increases a magnitude of the switching frequency 405 of the control signal 105.

Embodiments herein are useful over conventional techniques. For example, controller 140 supplies an output voltage 123 to the load 118 at a desired switching frequency 125. During transient conditions, the ON-time controller 140 modifies the switching frequency 405 and/or ON-time duration of the switch circuitry 151/152 in the power converter 165 to maintain the output voltage 123 within regulation during transient conditions. Subsequent to the transient condition, when the current consumption by the load 118 reverts back to steady state, a phase-locked loop circuit (such as in compensator 150) adjusts the ON-time duration of the switch 151 to maintain or bias the switching frequency 405 of the switch 151 at a desired setpoint frequency 125. Thus, during transient conditions, the switching frequency 405 of operating the switch 151/152 varies to maintain regulation of the output voltage 123. During steady states conditions, the power converter 135 (voltage converter 165) operates near its desired operating frequency 125, resulting in higher conversion efficiency of converting an input voltage 121 (such as a first DC voltage) to the output voltage 123 (such as a second DC voltage).

Figure 8:
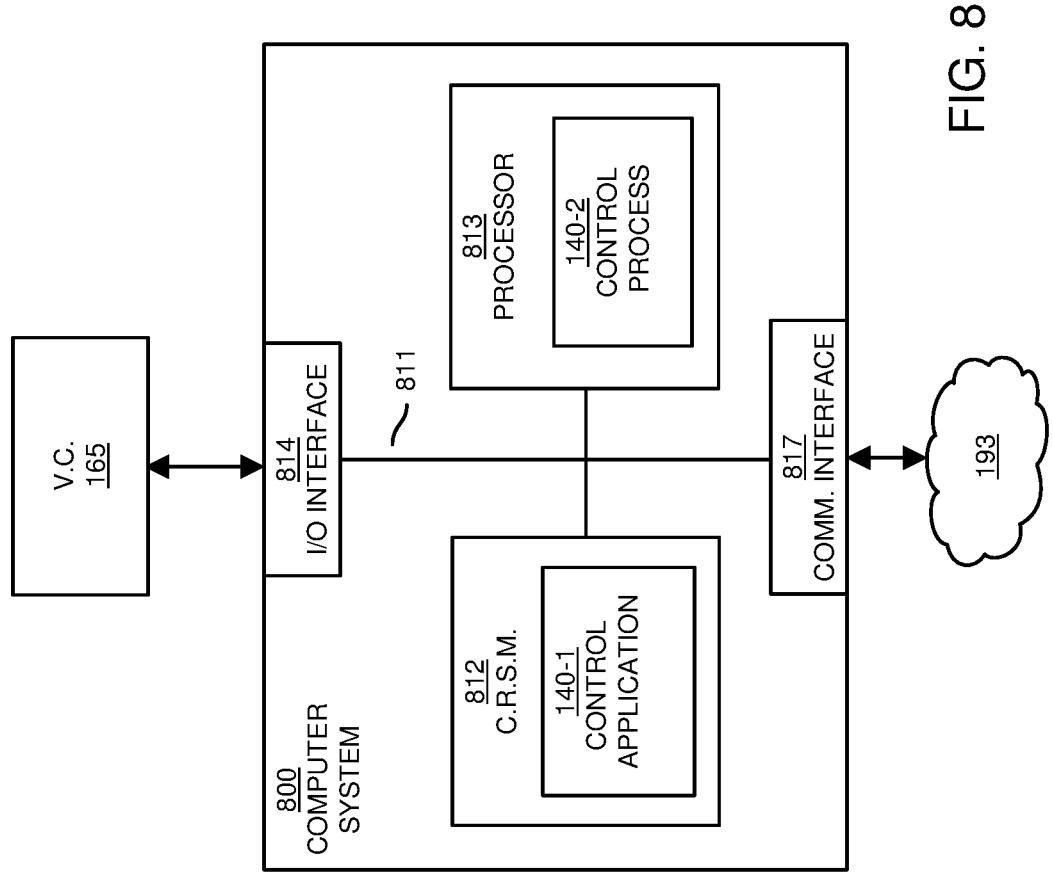
FIG. 8 is an example diagram illustrating computer processor hardware and related software instructions or logic circuit operative to execute methods according to embodiments herein.

FIG. 8 is an example block diagram of a computer device for implementing any of the operations as discussed herein according to embodiments herein.

As shown, computer system 800 (such as implemented by any of one or more resources such as controller 140, compensator 150, etc.) of the present example includes an interconnect 811 that couples computer readable storage media 812 such as a non-transitory type of media (or hardware storage media) in which digital information can be stored and retrieved, a processor 813 (e.g., computer processor hardware such as one or more processor devices), I/O interface 814, and a communications interface 817.

I/O interface 814 provides connectivity to any suitable circuitry such as each of phases 110.

Computer readable storage medium 812 can be any hardware storage resource or device such as memory, optical storage, hard drive, floppy disk, etc. In one embodiment, the computer readable storage medium 812 stores instructions and/or data used by the control application 140-1 (such as operations of compensator 150 or other suitable resource) to perform any of the operations as described herein.

Further in this example embodiment, communications interface 817 enables the computer system 800 and processor 813 to communicate over a resource such as network 193 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 800.

In accordance with different embodiments, note that computer system 800 can be a micro-controller device, logic, hardware processor, hybrid analog/digital circuitry, etc., configured to control a power supply and perform any of the operations as described herein.

Functionality supported by the different resources will now be discussed via flowchart in FIG. 9. Note that the steps in the flowcharts below can be executed in any suitable order.

Figure 9:
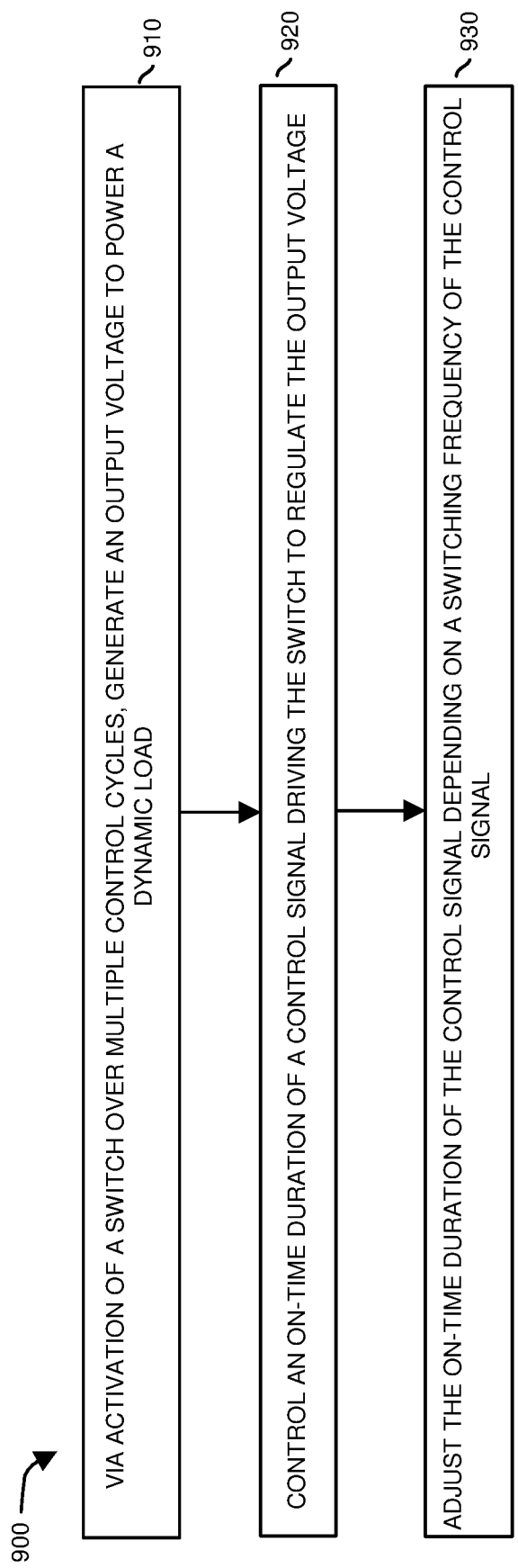
FIG. 9 is an example diagram illustrating a method according to embodiments herein.

FIG. 9 is an example diagram illustrating a method of providing compensation in a power converter according to embodiments herein.

In processing operation 910, via activation of switch (such as high side switch circuitry 151) over multiple control cycles, the ON-time controller 140 generates an output voltage 123 to power the dynamic load 118.

In processing operation 920, the control 140 controls an on-time duration of control signal 105-1 driving the high side switch circuitry 151 to regulate the output voltage 123 within a desired range.

In processing operation 930, the controller 140 adjusts the on-time duration of the control signal 105-1 depending on a switching frequency of the control signal 105 for one or more previous control cycles.

Figure 10:
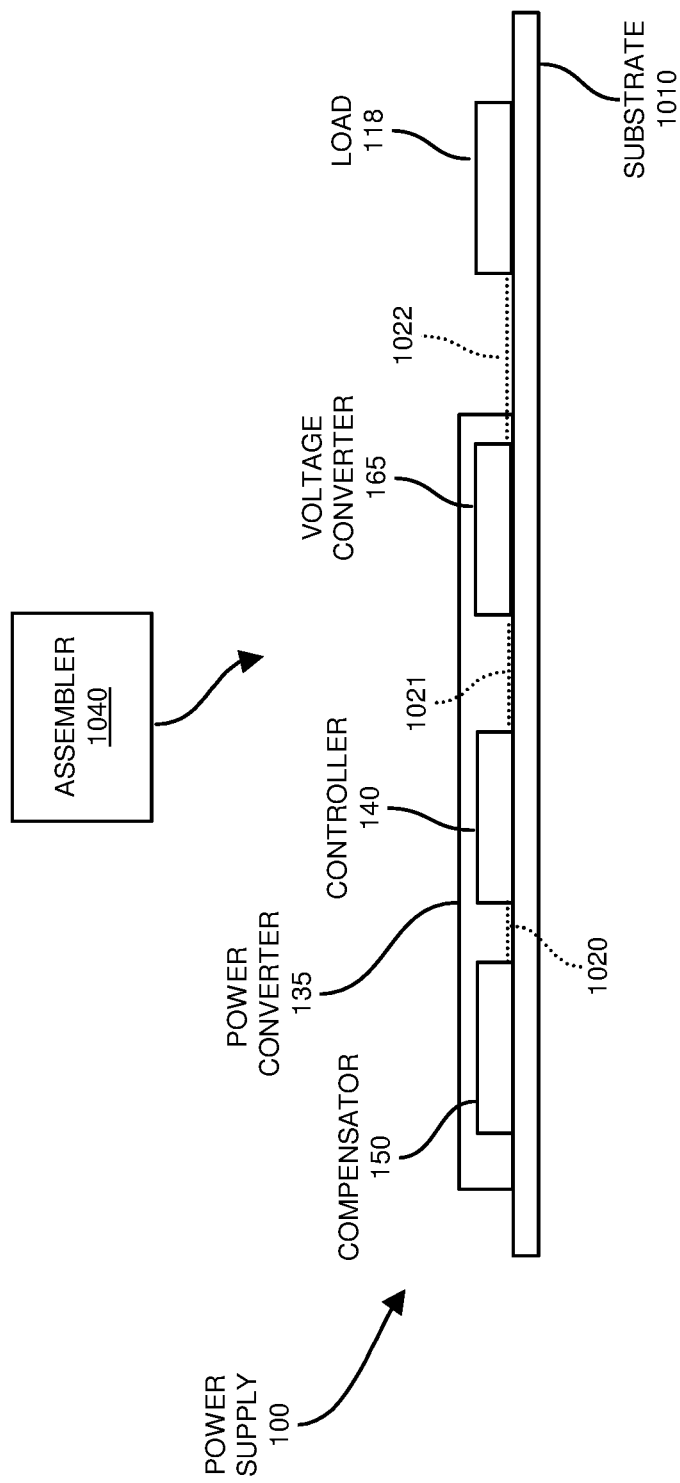
FIG. 10 is an example diagram illustrating assembly of a power supply according to embodiments herein.

FIG. 10 is an example diagram illustrating assembly of a power converter circuit on a circuit board according to embodiments herein.

In this example embodiment, assembler 1040 receives a substrate 1010 (such as a circuit board or other suitable resource). The substrate 1010 can be rigid, flexible, etc. The assembler 1040 affixes (couples) the compensator 150, controller 140, voltage converter 165, etc., to the substrate 1010.

Circuit paths 1020 (such as one or more traces, electrical conductors, cables, wires, etc.) couple the compensator 150 to the power controller 140. Via circuit paths 1021 (such as one or more traces, electrical conductors, cables, wires, etc.), the assembler 1040 couples the controller 140 to the voltage converter 165.

Note that components such as the controller 140, voltage converter 165, and corresponding components such as compensator 150, etc., associated with the power converter 135 can be affixed or coupled to the substrate 1010 in any suitable manner. For example, one or more of the components (such as compensator 150, controller 140, voltage converter 165, etc.) in power supply 100 can be soldered to the substrate, inserted into sockets on the substrate 1010, etc.

Note further that the substrate 1010 is optional. Circuit paths 1020, 1021, 1022, etc., may be disposed in cables providing connectivity between respective components on the substrate 1010.

In one nonlimiting example embodiment, the load 118 is disposed on its own substrate independent of substrate 1010; additionally, or alternatively, the substrate of the load 118 is directly or indirectly connected to the substrate 1010. The controller 140 or any portion of the power converter 135, any portion of the compensator 150, etc., can be disposed on a standalone smaller board plugged into a socket of the substrate 1010.

Via one or more circuit paths 1022 (such as one or more traces, cables, connectors, wires, conductors, electrically conductive paths, etc.), the assembler 1040 couples the voltage converter 165 to the load 118. In one embodiment, the circuit path 1022 conveys the output voltage 123 generated from the voltage converter 165 to the load 118.

Accordingly, embodiments herein include a system comprising: a substrate 1010 (such as a circuit board, standalone board, mother board, standalone board destined to be coupled to a mother board, host, etc.); a compensator 150, power converter 135, etc., including corresponding components as described herein; and a load 118. As previously discussed, the load 118 is powered based on conveyance of output voltage 123 and corresponding current 139 conveyed over one or more circuit paths 1022 from the voltage converter 165 to the load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. An apparatus comprising:
an ON-time controller operative to, over time, control an ON-time duration of a control signal driving a switch to regulate an output voltage, the output voltage powering a dynamic load, the ON-time duration representing a time of activating the switch to produce the output voltage; and
a compensator in communication with a ramp voltage generator of the ON-time controller, the ramp voltage generator operative to produce a ramp voltage, the compensator operative to adjust a slope of the ramp voltage depending on a magnitude of a switching frequency of the control signal with respect to a desired switching frequency setpoint, the ON-time duration of the control signal varying depending on the adjusted slope of the ramp voltage, wherein the compensator is further operable to:
derive a first voltage from the control signal;
derive a second voltage from a setpoint frequency signal representing the desired switching frequency setpoint;
produce a ramp adjustment signal based on a difference in magnitude between the first voltage and the second voltage; and
adjust the slope of the ramp voltage via the ramp adjustment signal.

2. The apparatus as in claim 1, wherein the compensator includes a phase-locked loop operative to maintain the magnitude of the switching frequency of the control signal at the desired switching frequency setpoint via adjustments to the slope of the ramp voltage.

3. The apparatus as in claim 1, wherein changes in output current supplied by the output voltage to the dynamic load results in a change in the magnitude of the switching frequency of the control signal; and
wherein adjustments to the slope of the ramp voltage via the compensator changes the ON-time duration and the magnitude of the switching frequency of the control signal.

4. The apparatus as in claim 1, wherein the compensator includes a comparator operative to adjust the ON-time duration of the control signal for a subsequent control cycle of operating the switch based on a difference between the switching frequency of the control signal and the desired switching frequency setpoint.

5. The apparatus as in claim 1, wherein adjustment to the ramp voltage results in increasing the ON-time duration and decreasing the switching frequency of the control signal while operating in a constant ON-time control mode of controlling the switch over multiple control cycles.

6. The apparatus as in claim 1 further comprising:
a power converter in which the switch resides, the power converter operative to convert an input voltage into the output voltage that powers the load; and
wherein the variations to the ON-time duration are based on the adjusted ramp voltage, which provides compensation via a frequency shift caused by resistive losses of the power converter including the switch.

7. The apparatus as in claim 1, wherein the ramp voltage generator includes:
a capacitor to store the ramp voltage; and
a current source operative to supply current to the capacitor, the supplied current producing the ramp voltage stored in the capacitor, the ON-time controller further comprising:
a comparator operative to compare the ramp voltage to a threshold value, an output of the comparator controlling operation of the control signal.

8. The apparatus as in claim 7, wherein the compensator is operative to produce a drive current that adjusts the slope of the ramp voltage depending on a comparison of the switching frequency of the control signal to the desired switching frequency setpoint.

9. The apparatus as in claim 1, wherein the ON-time controller is operative to control the ON-time duration as a function of an input voltage and the output voltage, the switch controlled via the control signal to convert the input voltage into the output voltage.

10. The apparatus as in claim 1, wherein the compensator generates compensation adjustment signals whose magnitudes vary depending on a difference between the switching frequency of the control signal and the desired switching frequency setpoint.

11. The apparatus as in claim 1, wherein the compensator is operative to produce both a source current and a sink current to adjust the slope of the ramp voltage, magnitudes of the source current and the sink current varying depending on a difference between the switching frequency of the control signal and the desired switching frequency setpoint.

12. A system comprising:
a circuit substrate;
the apparatus of claim 1, the apparatus coupled to the circuit substrate; and
wherein the load is coupled to the substrate.

13. A method comprising:
receiving a circuit substrate; and
coupling the apparatus of claim 1 to the circuit substrate.

14. The apparatus as in claim 1, wherein the slope of the ramp voltage varies at least in part based on an input voltage converted by the switch into the output voltage.

15. The apparatus as in claim 1, wherein an increase in an amount of current consumed by the dynamic load causes a temporary increase in the magnitude of the switching frequency of the control signal to be above the desired switching frequency setpoint.

16. The apparatus as in claim 1, wherein the ON-time controller is operative to:
compare the adjusted ramp voltage to a threshold value; and
deactivate the switch in response to the adjusted ramp voltage crossing the threshold value.

17. The apparatus as in claim 16, wherein the ON-time controller is further operative to:
reset the adjusted ramp voltage to an initial value in response to the adjusted ramp voltage crossing the threshold value.

18. The apparatus as in claim 1, wherein the ON-time controller is operative to:
monotonically ramp a magnitude of the ramp voltage during activation of the switch.

19. The apparatus as in claim 1, wherein adjustment of the ramp voltage temporarily increases the magnitude of the switching frequency of the control signal in order to accommodate a change in current supplied by the output voltage to the dynamic load.

20. The apparatus as in claim 1, wherein adjustment of the ramp voltage temporarily decreases the magnitude of the ON-time duration of the control signal to accommodate a change in current supplied by the output voltage to the dynamic load.

21. A method comprising:
via activation of a switch over multiple control cycles, generating an output voltage to power a dynamic load;
controlling an ON-time duration of a control signal driving the switch to regulate the output voltage;
producing a ramp voltage; and
adjusting a slope of the ramp voltage depending on a magnitude of a switching frequency of the control signal with respect to a desired switching frequency setpoint, the ON-time duration of the control signal varying depending on the adjusted slope of the ramp voltage, the method further comprising:
deriving a first voltage from the control signal;
deriving a second voltage from a setpoint frequency signal representing the desired switching frequency setpoint;
producing a ramp adjustment signal based on a difference in magnitude between the first voltage and the second voltage; and
adjusting the slope of the ramp voltage via the ramp adjustment signal.

22. The method as in claim 21 further comprising:
via a phase-locked loop, maintaining the magnitude of the switching frequency of the control signal at the desired switching frequency setpoint via adjustments to the slope of the ramp voltage.

23. The method as in claim 21, wherein changes in output current supplied by the output voltage to the dynamic load results in a change in the magnitude of the switching frequency of the control signal; and
wherein adjustments to the slope of the ramp voltage changes the ON-time duration and the magnitude of the switching frequency of the control signal.

24. The method as in claim 21 further comprising:
adjusting the ON-time duration of the control signal for a subsequent control cycle of operating the switch based on a difference between the switching frequency of the control signal and the desired switching frequency setpoint.

25. The method as in claim 21, wherein adjustment to the ramp voltage results in increasing the ON-time duration and decreasing the magnitude of the switching frequency of the control signal while operating in a constant ON-time control mode of controlling the switch over multiple control cycles.

26. The method as in claim 21 further comprising:
converting an input voltage into the output voltage that powers the load; and
wherein the variations to the ON-time duration are based on the adjusted ramp voltage, which provides compensation of a frequency shift caused by resistive losses of a power converter circuit including the switch.

27. The method as in claim 21 further comprising:
supply current from a current source to a capacitor, the supplied current producing the ramp voltage, the ramp voltage stored in the capacitor; and
producing the control signal based on comparison of the ramp voltage to a threshold value.

28. The method as in claim 27 further comprising:
adjusting the slope of the ramp voltage depending on a comparison of the switching frequency of the control signal to the desired switching frequency setpoint.

29. The method as in claim 21 further comprising:
controlling the ON-time duration of the control signal as a function of an input voltage and the output voltage, the switch controlled via the control signal to convert the input voltage into the output voltage.

30. The method as in claim 21 further comprising:
generating compensation adjustment signals whose magnitudes vary depending on a difference between the switching frequency of the control signal and the desired switching frequency setpoint.

31. The method as in claim 21 further comprising:
producing both a source current and a sink current to adjust the slope of the ramp voltage, magnitudes of the source current and the sink current varying depending on a difference between the switching frequency of the control signal and the desired switching frequency setpoint, the source current and the sink current adjusting the switching frequency of the control signal.

32. An apparatus comprising:
an ON-time controller operative to, over time, control an ON-time duration of a control signal driving a switch to regulate an output voltage, the output voltage powering a dynamic load, the ON-time duration representing a time of activating the switch to produce the output voltage; and
a compensator in communication with a ramp voltage generator of the ON-time controller, the ramp voltage generator operative to produce a ramp voltage, the compensator operative to adjust a slope of the ramp voltage depending on a magnitude of a switching frequency of the control signal with respect to a desired switching frequency setpoint, the ON-time duration of the control signal varying depending on the adjusted slope of the ramp voltage, wherein the compensator is further operable to:
produce a first compensation signal based on the switching frequency of the control signal;
produce a second compensation signal based on a setpoint frequency signal associated with the desired switching frequency setpoint;
adjust the slope of the ramp voltage via the first compensation signal and the second compensation signal;
wherein a magnitude of the first compensation signal is based on a duty cycle of the control signal; and
wherein a magnitude of the second compensation signal is based on a duty cycle of the setpoint frequency signal associated with the desired switching frequency setpoint.

* * * * *